（12）United States Patent
Madhavan et al.

(10) Patent No.: US 8,909,194 B2
(45) Date of Patent: Dec. 9, 2014

(54) PHYSICAL LOCATION VERIFICATION

(75) Inventors: Poovanpilli G. Madhavan, Bellevue, WA (US); David A. Roberts, Redmond, WA (US); Mohammad Shabbir Alam, Redmond, WA (US); Zhong Deng, Redmond, WA (US); Sharad Mittal, Redmond, WA (US); Ankur Agiwal, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 876 days.

(21) Appl. No.: 11/635,864

(22) Filed: Dec. 8, 2006

(65) Prior Publication Data

US 2007/0081508 A1    Apr. 12, 2007

Related U.S. Application Data

(63) Continuation-in-part of application No. 11/112,241, filed on Apr. 21, 2005, now Pat. No. 7,720,018.

(51) Int. Cl.
| | |
|---|---|
| *H04M 1/66* | (2006.01) |
| *H04L 29/06* | (2006.01) |
| *H04L 29/08* | (2006.01) |
| *H04W 52/28* | (2009.01) |
| *H04W 12/04* | (2009.01) |
| *H04W 52/36* | (2009.01) |
| *H04W 8/00* | (2009.01) |

(52) U.S. Cl.
CPC .......... *H04W 52/28* (2013.01); *H04L 63/0492* (2013.01); *H04L 63/061* (2013.01); *H04W 52/283* (2013.01); *H04L 67/14* (2013.01); *H04W 12/04* (2013.01); *H04W 52/367* (2013.01); *Y04S 40/24* (2013.01); *H04W 8/005* (2013.01); *H04W 52/281* (2013.01)

USPC .......... 455/411; 455/41.2; 455/440; 455/457; 370/338; 370/331

(58) Field of Classification Search
USPC ................. 370/328, 338; 455/410–411, 41.2, 455/456.1–457, 440, 441, 1
See application file for complete search history.

(56) References Cited

U.S. PATENT DOCUMENTS

| | | |
|---|---|---|
| 5,610,969 A | 3/1997 | McHenry et al. |
| 5,909,429 A | 6/1999 | Satyanarayana et al. |

(Continued)

FOREIGN PATENT DOCUMENTS

GB          2342010 A       3/2000

OTHER PUBLICATIONS

International Search Report from International Application PCT/US2006/14928.

(Continued)

*Primary Examiner* — Sharad Rampuria
(74) *Attorney, Agent, or Firm* — John Jardine; Kate Drakos; Micky Minhas

(57) ABSTRACT

A process for secure, safe, and easy provisioning of a wireless device with credentials to connect to a wireless network. A connecting wireless device and an established wireless device both utilize low power transmission at close proximity to exchange wireless connection setting information and/or a password. The connecting wireless device is moved into proximity with the established wireless device and a low power setting is discovered at which the wireless devices may communicate with a sufficiently low error rate. The proximity of the connecting wireless device to the established wireless device is verified and the connecting wireless device is then passed the secret information by the established network device.

19 Claims, 12 Drawing Sheets

(56) References Cited

U.S. PATENT DOCUMENTS

| | | | |
|---|---|---|---|
| 6,029,147 A | 2/2000 | Horadan et al. | |
| 6,119,006 A * | 9/2000 | Shaffer et al. | 455/440 |
| 6,148,205 A * | 11/2000 | Cotton | 455/435.1 |
| 6,243,413 B1 * | 6/2001 | Beukema | 375/222 |
| 6,791,581 B2 | 9/2004 | Novak et al. | |
| 7,079,494 B2 | 7/2006 | Marinier et al. | |
| 7,346,364 B1 | 3/2008 | Tsien et al. | |
| 7,522,908 B2 * | 4/2009 | Hrastar | 455/411 |
| 7,715,796 B2 * | 5/2010 | Honda et al. | 455/41.2 |
| 7,821,986 B2 * | 10/2010 | Thomson et al. | 370/328 |
| 2001/0011023 A1 | 8/2001 | Nishioka et al. | |
| 2002/0123325 A1 * | 9/2002 | Cooper | 455/411 |
| 2003/0022656 A1 * | 1/2003 | Hinnant et al. | 455/410 |
| 2003/0101190 A1 | 5/2003 | Horvitz et al. | |
| 2003/0115267 A1 | 6/2003 | Hinton et al. | |
| 2004/0002352 A1 | 1/2004 | Sendonaris | |
| 2004/0111520 A1 | 6/2004 | Krantz et al. | |
| 2004/0130524 A1 * | 7/2004 | Matsui | 345/156 |
| 2004/0162059 A1 | 8/2004 | Hiltunen et al. | |
| 2004/0174833 A1 | 9/2004 | Raith | |
| 2004/0205257 A1 * | 10/2004 | Hughes et al. | 710/1 |
| 2004/0258012 A1 * | 12/2004 | Ishii | 370/328 |
| 2005/0008148 A1 * | 1/2005 | Jacobson | 380/26 |
| 2005/0018686 A1 | 1/2005 | Garashi et al. | |
| 2005/0064870 A1 * | 3/2005 | Gabara et al. | 455/438 |
| 2006/0046692 A1 | 3/2006 | Jelinek et al. | |
| 2006/0058053 A1 * | 3/2006 | Jatschka | 455/522 |
| 2006/0075230 A1 * | 4/2006 | Baird et al. | 713/168 |
| 2006/0187865 A1 | 8/2006 | Sakai | |
| 2007/0121540 A1 * | 5/2007 | Sharp et al. | 370/328 |

OTHER PUBLICATIONS

Anonymous, "Bingo Wireless™ Launches Pocket Boingo Wi-Fi Software," News: *Infrastructure, Products & Services*, Issue #2002-45, 2 pgs (Nov. 2002) printed at http://www.mobileinfo.come/news_2002/Issue45/Boingo_PDA.htm on Dec. 10, 2004.

ECMA International, "Near Field Communication—White Paper," ECMA/TC32-TG19/2004, (9 pages).

Chinese Office Action from related application 200680012461.4 dated May 20, 2011.

Chinese Office Action from related application 200680012461.4 dated Mar. 31, 2012.

* cited by examiner

PHYSICAL LOCATION VERIFICATION

CROSS-REFERENCE TO RELATED APPLICATIONS

This Application is a Continuation-in-part of application Ser. No. 11/12241, entitled "Low Power Provisioning for Wireless Network Devices" filed on Apr. 21, 2005.

FIELD OF THE INVENTION

This invention pertains generally to computer systems, and, more particularly, to securely establishing communication with a wireless network.

BACKGROUND OF THE INVENTION

Today, people often use wireless communication so that connections may be easily established between various electronic device. In a home setting, a wireless network may carry music, video, financial, and other data between devices that can be set up in any room in the house without any special network wiring. In a business setting, a wireless network allows users of portable computers to access servers, databases, printers and other network devices from any office, conference room or other work space. Similarly, users of portable electronic devices, such as PDAs and SmartPhones, may use wireless networks to synchronize their portable electronic devices with desktop computers or other devices that they do not carry with them.

However, the same ease of communication that allows wireless networks to be used in many settings creates a security risk. Unauthorized users may also take advantage of the ease of establishing connections wirelessly to gain access to networked information or devices for malicious purposes. For this reason, people utilizing wireless communications demand security. Data exchange between devices should be protected from eavesdropping and impersonation. For example, an unauthorized user may engage in what is sometimes called a "man in the middle" attack. As part of a man in the middle attack, an unauthorized user monitors authorized communications between two devices to obtain sufficient information about parameters used by those devices to communicate to enable the unauthorized user to emulate one or both of the authorized devices.

To reduce the possibility of unauthorized access, many wireless devices use keys, security settings or other cryptographic information to restrict access to wireless communications. While such information can reduce the probability that an unauthorized user will improperly gain access to a wireless network, the security information may be transmitted wirelessly. If transmissions containing security information are intercepted by an unauthorized user, the user may still be able to gain unauthorized access through the wireless network.

BRIEF SUMMARY OF THE INVENTION

To reduce the risk that an unauthorized party can access a network through a wireless connection, security information exchanged wirelessly between authorized users is transmitted at low power. The exchange of information is intended to be made while the authorized devices are close together. To reduce the risk that an unauthorized party is impersonating an authorized device, prior to transmission of security information, an established network device checks whether a connecting network device is in close proximity. To make such a check, the established network device may provide information about an action that must be performed before the connecting network device will be authenticated. The information about the action is provided in such a way that it is obtainable only in close proximity to the device. Because physical security measures can deter an unauthorized third party from being in close enough proximity to the established network device to obtain the information, an unauthorized third party attempting to impersonate an authorized device will not have information about the required action and therefore will not be authenticated.

The foregoing is a non-limiting summary of the invention, which is defined by the attached claims.

BRIEF DESCRIPTION OF THE DRAWINGS

While the appended claims set forth the features of the invention with particularity, the invention and its advantages are best understood from the following detailed description taken in conjunction with the accompanying drawings, of which:

DETAILED DESCRIPTION OF THE INVENTION

Security for wireless communications may be established by communicating security information in a "whisper mode," in which low power transmissions are used to communicate security information. The whisper mode communications are transmitted with a power level sufficiently low that only connecting devices in close proximity to an established network device should be able to receive those transmissions. To enhance the security, a routine may be performed to verify that the is, in close proximity to the established network device.

By validating that the connecting network device is in close proximity to the registrar, physical security measures may prevent unauthorized third parties from obtaining wireless access to a network by impersonating an authorized device. The routine to verify that the connecting network device is in close proximity to the established network device may involve providing information in the format that is obtainable only in close proximity to the registrar device. The information may define an action to be taken before the connecting network device will be authenticated by the registrar. For example, audible or visual commands may be provided to an operator of a connecting network device, directing the operator to move the connecting network device in a prescribed pattern. Wireless transmissions from the connecting device may be analyzed at the established network device to validate that the connecting network device is moving in the prescribed pattern. Because unauthorized third parties who are not in close proximity to the established network device will not obtain information defining the required action, an unauthorized third party will not be able to perform the action as part of impersonating an authorized connecting network device. In this way, an unauthorized third party may be detected and denied access by the established network device.

In the following description, various aspects of the present invention will be described. For purposes of explanation, specific configurations and details are set forth in order to provide a thorough understanding of the present invention. However, it will also be apparent to one skilled in the art that the present invention may be practiced without the specific details. Furthermore, well-known features may be omitted or simplified in order not to obscure the present invention.

Prior to proceeding with a description of the various embodiments of the invention, a description of the computer and networking environment in which the various embodiments of the invention may be practiced will now be provided. Although it is not required, the present invention may be implemented by programs that are executed by a computer. Generally, such programs include routines, objects, components, data structures and the like that perform particular tasks or implement particular abstract data types.

Figure 1:
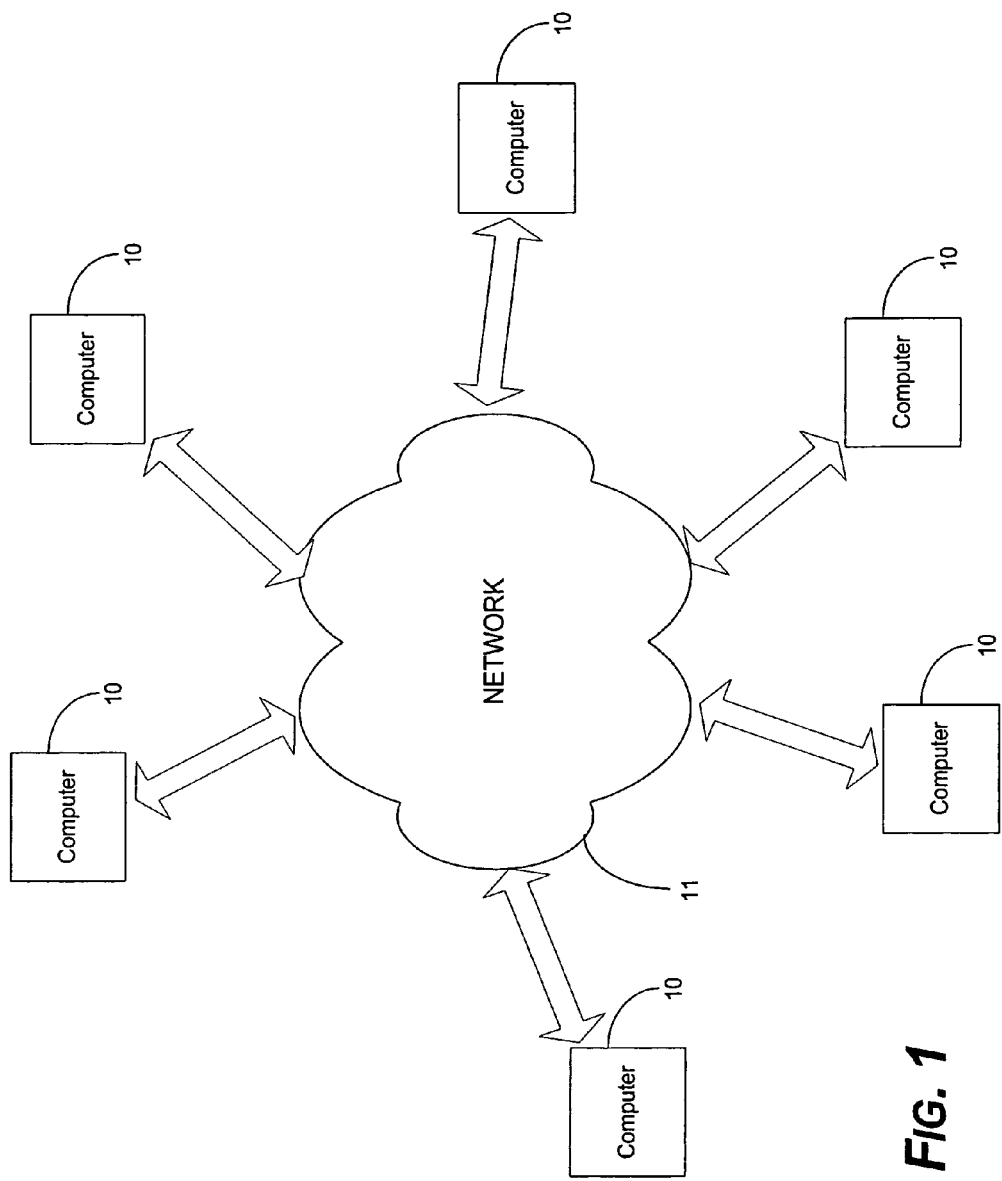
FIG. 1 is a block diagram representing a computer network into which the present invention may be incorporated.

An example of a networked environment in which the invention may be used will now be described with reference to FIG. 1. The example network includes several computers communicating with one another over a network 11, represented by a cloud. The network 11 may include many well-known components, such as routers, gateways, hubs, etc. and allows the computers 10 to communicate.

The present invention has particular application to wireless networks. Thus, for the purposes of this description, the network 11 is presumed to be a wireless network with most computers 10 connected to network 11 via wireless media, although one or more computers 10 may be connected via wired media.

When interacting with one another over the network 11, one or more of the computers 10 may act as clients, servers or peers with respect to other computers 10. Accordingly, the various embodiments of the invention may be practiced on clients, servers, peers or combinations thereof, even though specific examples contained herein do not refer to all of these types of computers.

Figure 2:
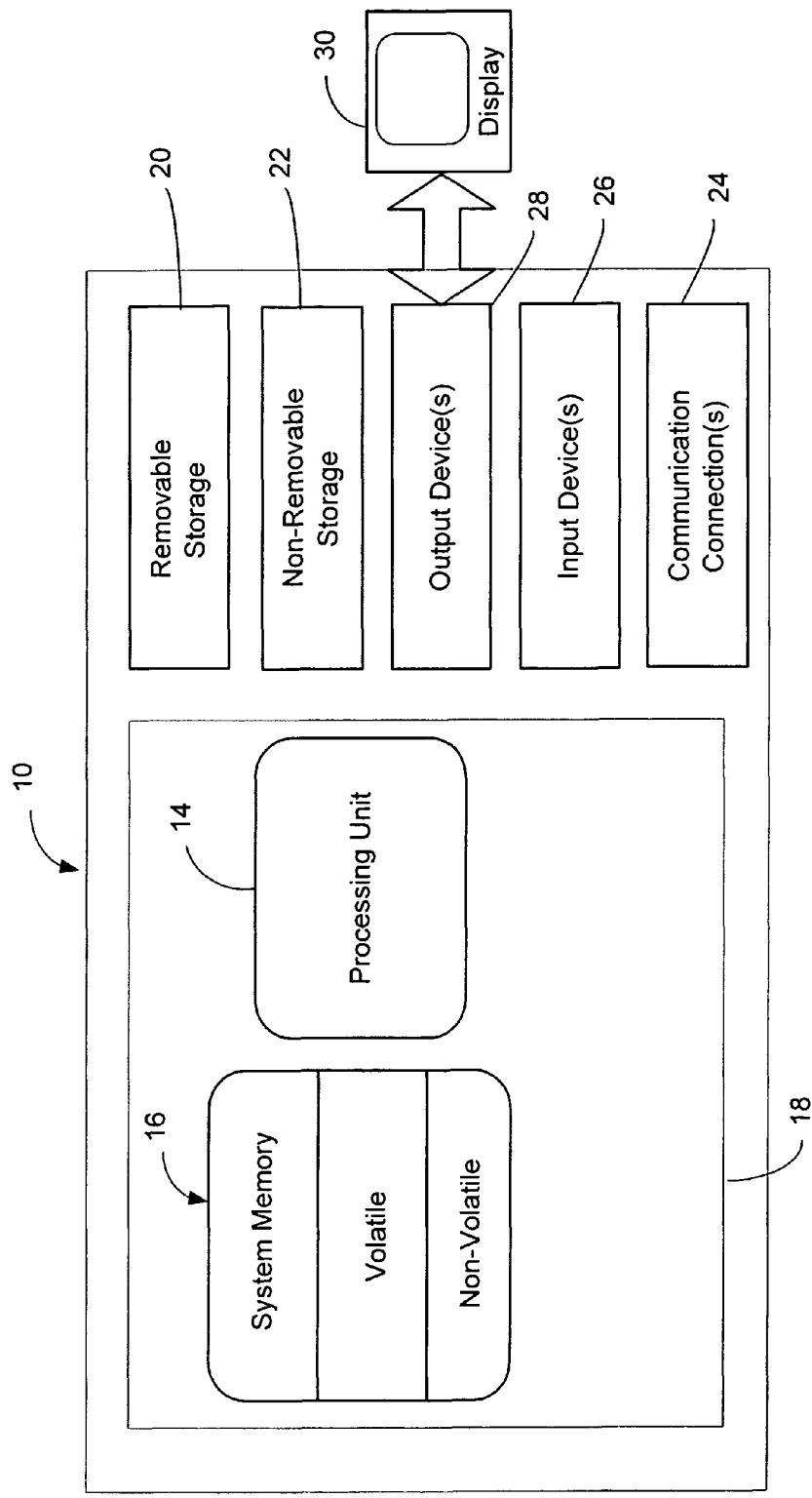
FIG. 2 is a block diagram of a computer into which the present invention may be incorporated.

Referring to FIG. 2, an example of a basic configuration for a computer 10 on which all or parts of the invention described herein may be implemented is shown. In its most basic configuration, the computer 10 typically includes at least one processing unit 14 and memory 16. The processing unit 14 executes instructions to carry out tasks in accordance with various embodiments of the invention. In carrying out such tasks, the processing unit 14 may transmit electronic signals to other parts of the computer 10 and to devices outside of the computer 10 to cause some result. Depending on the exact configuration and type of the computer 10, the memory 16 may be volatile (such as RAM), non-volatile (such as ROM or flash memory) or some combination of the two. This most basic configuration is illustrated in FIG. 2 by dashed line 18.

The computer 10 may have additional features and/or functionality. For example, the computer 10 may also include additional storage (removable storage 20 and/or non-removable storage 22) including, but not limited to, magnetic or optical disks or tape. Computer storage media includes volatile and non-volatile, removable and non-removable media implemented in any method or technology for storage of information, including computer-executable instructions, data structures, program modules, or other data. Computer storage media includes, but is not limited to, RAM, ROM, EEPROM, flash memory, CD-ROM, digital versatile disk (DVD) or other optical storage, magnetic cassettes, magnetic tape, magnetic disk storage or other magnetic storage devices, or any other tangible medium which can be used to stored the desired information and which can be accessed by the computer 10. Any such computer storage media may be part of computer 10.

The computer 10 preferably also contains communications connection(s) 24 that allow the device to communicate with other devices. A communication connection (e.g., one of the communication connections 24) is an example of a communication medium. Communication media typically embody computer readable instructions, data structures, program modules or other data in a modulated data signal such as a carrier wave or other transport mechanism and include any information delivery media. By way of example, and not limitation, the term "communication media" includes wired and wireless media, such as acoustic, RF, infrared and other wireless media. The term "computer-readable medium" as used herein includes both computer storage media and communication media. As another example, the computer may include input devices 26, output devices 28 and a display 30.

The present invention has particular application to connection of a wireless network device to a wireless network, and more specifically to provisioning a wireless network device with information needed to connect to a wireless network. The invention may also be used to exchange secret information between wireless devices. Thus, in accordance with an embodiment, the network 11 shown in FIG. 1 is a wireless network, and the computers 10 are devices either connected to, or attempting to connect to, the wireless network 11. As used herein, for ease of reference and not limitation, a device that is connected to a wireless network such as the network 11 is referred to as an "established network device" and a device attempting to connect to a wireless network is a "connecting network device".

A wireless network may be in any suitable form with any suitable number and type of devices. For example, a wireless network may be an infrastructure wireless network in which one or more devices connect through an access point. In such an embodiment, the access point may act as the "established network device". Devices equipped for wireless communication may gain access to a network through the access point. Alternatively, the network may be an ad hoc or mesh network in which wireless devices in close proximity may communicate.

In many instances, an established network device may be mounted at a fixed location or otherwise not readily movable. In contrast, the connecting network device may be a portable electronic device. However, the invention is not limited based on whether the networked devices are fixed or mobile.

Figure 3:
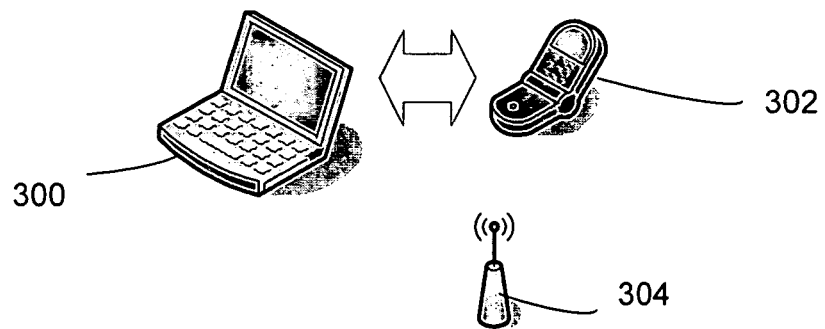
FIG. 3 is a diagram representing a connection being established by a connecting network device, in this example a phone, to an established network device, in this case a notebook computer, in accordance with an embodiment of the invention.

An example is shown in FIG. 3, where a notebook computer 300 (e.g., one of the computers 10) is an established network device and a phone 302 is a connecting network device. In accordance with an embodiment, a connecting network device may establish a connection to a wireless network via an established network device, such as the notebook computer 300, such as is shown by the arrow in FIG. 3. As an alternative, a connecting network device, such as the phone 302, may establish a connection with an access point 304 such as is shown by the arrow in FIG. 4. As is known, infrastructure wireless networks typically include one or more access points (APs), such as the access point 304, through which a wireless device, such as the wireless enabled computer 300, may connect to the network. In general, an access point is a structure or node through which a wireless device may access a wireless network. The access point may include a computing device that can manage communications with a connecting network device to authenticate the connecting network device. Authenticated devices may be granted access to the rest of the network through the access point. Communications from devices that are not authenticated may be blocked by the access point from reaching the rest of the network.

Figure 4:
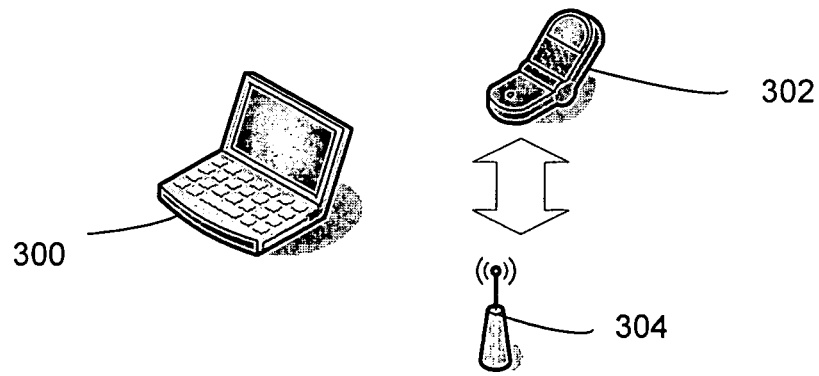
FIG. 4 is a diagram representing connection being established by a connecting network device, in this example a phone, to an access point in accordance with an embodiment of the invention.

Though FIGS. 3 and 4 show access point 304 as a structure separate from devices communicating wirelessly an access point may be implemented in any suitable device. For example, a desktop computer with a wireless network interface card may be configured as an access point. Similarly, though access points are frequently installed at fixed locations, even a portable electronic device may be configured as an access point.

Figure 5:
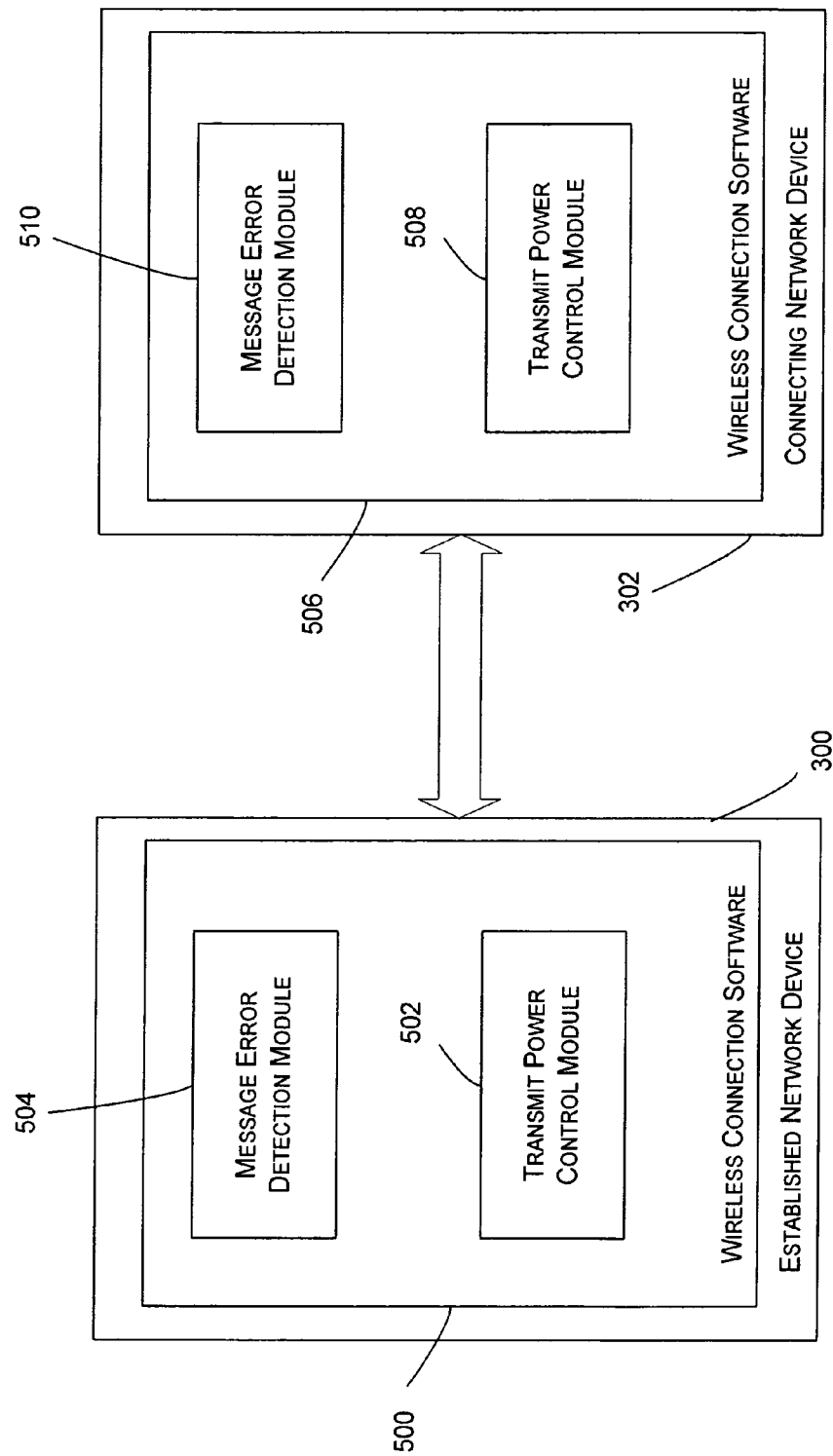
FIG. 5 shows architectures of an established network device and a connecting network device in accordance with an embodiment of the invention.

FIG. 5 shows architectures of an established network device, such as the notebook computer 300, and a connecting network device, such as the phone 302, in accordance with an embodiment of the invention. Each of the devices 300, 302 includes wireless network software 500, 506. In the embodiments shown, the wireless network software 500, 506 each include a transmit power control module 502, 508 and a message error detection module 504, 510.

Though FIG. 5 does not expressly show a transmitter or receiver in either of the established network device 300 or connecting network device 302, such hardware may be included in the devices for establishing a wireless link at the physical level between the devices. Operation of that hardware may be controlled by the software modules depicted in FIG. 5. The transmit power control module 502 or 508 permits a network device, such as the established network device 300 or the connecting network device 302, to reduce or increase radio transmit power. Such function is provided, for example, by the transmit power control (TPC) features of IEEE 802.11h wireless network devices. Transmit power control in IEEE 802.11h wireless network devices can be utilized to reduce interference. Transmit power control in IEEE 802.11h wireless network devices can also be used to manage power consumption of wireless devices and the range between access points of wireless devices. Although TPC in IEEE 802.11h wireless network devices is one way of providing the function of the transmit power control modules 502 or 508, other structures or modules may be used.

The message error detection module 504 or 510 is utilized to detect transmission errors in received messages. For example, the message error detection module 510 on the connecting network device 302 may be utilized to determine whether there is an error in a message received from the establish network device 300. As an example, an error may be caused by insufficient power transmission by the sending network device, which in turn may be the result of a transmission with too low a power level and/or too much physical distance between the devices. The message error detection module may need to calculate the error rate associated with the current device positions and power levels to assess if the channel is adequate for transmission of necessary credentials and settings associated with two or more attempts at the same power level and device proximity.

In one embodiment, the message error detection module is a cyclic redundancy check (CRC) detection module. As is known, a cyclic redundancy check is a number derived from, and stored or transmitted with, a block of data in order to detect errors due to corruption of transmitted bits. By recalculating the cyclic redundancy check at the CRC detection module and comparing it to the value originally transmitted, the receiver can detect some types of transmission errors. In some embodiments, a CRC detection module consists of a simple division or multiplication of two polynomials derived from received bits and a stored fixed generator polynomial. A zero remainder of the operation indicates that no error was detected. A person skilled in the art will be able to implement such a CRC detection module using this or any other suitable algorithm. Although a cyclic redundancy check detection module is described in embodiments herein, other message error detection modules may be used.

Figure 6:
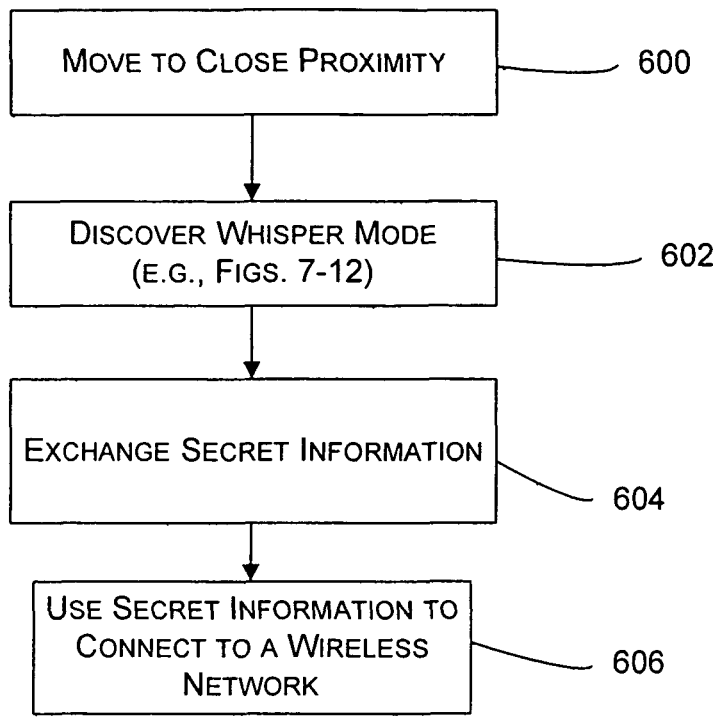
FIG. 6 is a flowchart of a process for provisioning a connecting network device to a wireless network in accordance with an embodiment.

FIG. 6 is a flowchart generally representing steps for provisioning a connecting network device, such as the connecting network device 302, to a wireless network in accordance with an embodiment of a connection process that limits opportunities for unauthorized third parties to gain access to the network. Beginning at step 600, the connecting network device 302 is brought into close proximity to an established network device, such as the established network device 300. The established network device, for example, may be any suitable device, including another computer acting either as a host for an ad hoc network or an access point for an infrastructure network. Alternatively, the established network device 300 may be a dedicated device acting as an access point, such as the access point 304.

In the illustrated embodiment, the connecting network device is a portable electronic device, allowing it to be readily moved into close proximity with another device acting as an established network device. However, the device itself need not be movable. In some embodiments, a pendant or other device with a wireless transmitter and receiver may serve as a proxy for the connecting network device. The proxy device may be wired to the connecting network device so that communications between the pendant and the connecting network device cannot be intercepted wirelessly by unauthorized third parties. However, any connection that is suitably immune to interception by unauthorized third parties may be used between the proxy device and the connecting network device. A pendant or other proxy device may alternatively or additionally be connected through a suitably immune connection path to the established network device. For example, optical fibers, laser light or any other directed radiation may be used to establish communication between a pendant, if used, and the connecting device.

At step 602, low transmit power settings for the connecting network device 302 and the established network device 300 that are sufficient for wireless exchange of messages between the connecting network device 302 and the established network device 300 are discovered for both the connecting network device 302 and the established network device 300. The discovery process may include manipulation of transmission power, transmission data rates, modulation schemes, antennae tuning and/or steering, and forward error correction in order to minimize the necessary power per bit arriving at the receiver. Throughout this document, such low transmit power settings are referred to herein collectively as creating a "whisper mode" of communication. The whisper mode in one embodiment is the lowest discovered transmit power settings for the connecting network device 302 and the established network device 300 in which sufficiently low errors are detected between messages exchanged between the two devices. A setting higher than the lowest discovered settings may be used for whisper mode, but utilizing a lower setting has advantages as are described below. Examples of methods for discovering whisper mode are described with the discussion of FIGS. 7-12.

At step 604, after the whisper mode settings have been discovered, the connecting network device 302 and the established network device 300 exchange secret information. This secret information may be, for example, network connection settings, a cryptographic key, or another shared secret utilized for a connecting network device to communicate wirelessly with or through the established network device. To this end, the process of FIG. 6 may be utilized for any wireless interface that uses some form of key or shared secret for normal operations, including, but not limited to, 802.llx networks, Bluetooth, and W-USB. Moreover, the process of steps 600-604 may be used to exchange any secret information between devices.

By exchanging secret information in whisper mode, two wireless devices that need to communicate with each other are both operating at very low transmission power levels when they exchange the information. Thus, the potential of an eavesdropper capturing the information is greatly diminished, especially given the fact that signal strength typically drops in proportion to the square of the distance between the devices. Thus, if the connecting network device 302 and the established network device 300 are operating at a low transmit power with sufficiently low errors, a potential eavesdropper would have to be just as close to the established network device as the connecting device or have a significantly more efficient receiver to intercept the transmission. Given the significant drop in signal strength, if the proximity is chosen to be very close (e.g., 1 meter), it is doubtful that an eavesdropper could intercept a message from another room. Thus, the method of the present invention provides a very secure method of exchanging information. Cryptography, such as PKI exchange can also be utilized to further reduce passive eavesdropping of transfer of credentials and settings.

The secret information, once received, may be used for a number of purposes, but in accordance with one embodiment, the secret information is a password and/or other configuration information needed to connect to a wireless network, and is used by the connecting network device 302 to automatically establish a connection to the wireless network (step 606). The connecting network device 302 may be configured to automatically attempt to establish a connection once it has received the secret information, or a user may be requested to approve a connection or provide additional information after the secret information is received. However, in an embodiment, the user has no further input and a connection is automatically established after receipt of the secret information. Thus, a user does not have to find and/or enter configuration settings, a password, or other information to establish a connection between the connecting network device 302 and a wireless network.

Figure 7:
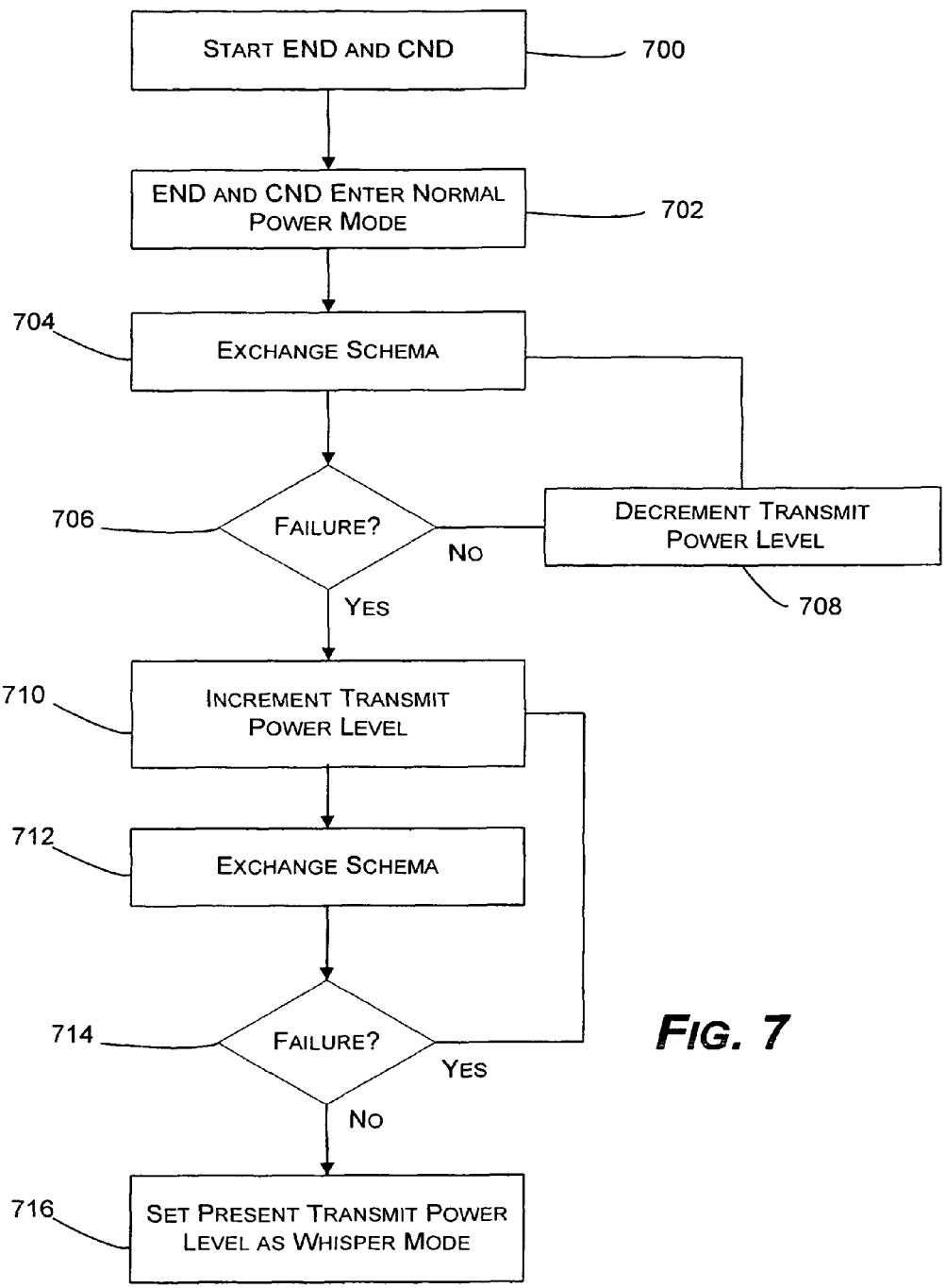
FIG. 7 is a flowchart of a process for discovering whisper mode in accordance with an embodiment of the invention.

FIG. 7 is a flowchart generally representing steps for discovering whisper mode settings in accordance with an embodiment of the invention. For each of the flowcharts shown in FIGS. 7, 9, and 11, it is assumed that both devices 300, 302 are electronically active at the beginning of the process.

Beginning at step 700, a user selects or otherwise actuates a start sequence for both the established network device 300 (END) and the connecting network device 302 (CND). This may be done, for example, by a special button provided on each of the devices, a key stroke pattern, or some other user input. The start sequence may be different for different types of devices and in some cases devices may initiate the sequence on their own. However, any suitable user interface or defined actions may be used to start the sequence.

Once the process is started, the devices exchange messages to search for a low power level that nonetheless supports communication between the devices. At step 702, the established network device 300 and the connecting network device 302 initially go into normal power mode, which represents a transmit power mode in normal operation and, for example, may be the highest transmit power mode available for the devices. At step 704, the established network device 300 and the connecting network device 302 exchange a schema. The schema may be, for example, the output of a cyclic redundancy check, and can be an arbitrary single cyclic redundancy check code word. In accordance with an embodiment, the exchange of the schema in step 704 involves the established network device 300 sending a schema to the connecting network device 302, and the connecting network device returning the same schema or a derivation thereof. This sequence prevents unwanted third parties from interfering with an existing exchange.

At step 706, a determination is made whether there is a failure in the exchange of the schema, which typically would not occur in the first exchange when both of the devices are in normal power mode and the devices are functioning correctly. If a failure does not occur, then step 706 branches to step 708, where the transmit power level of the established network device 300 and the connecting network device 302 are both decremented, for example by the transmit power control modules 502, 508. The process then branches back to step 704.

This process continues, exchanging schema and decrementing the power level of each of the devices 300, 302, until the power is so low that there is a failure in reading the schema at step 706. This failure can be detected, for example, by the message error detection module 504 or 510.

The power levels for transmission are increased until a power level reliably supporting communication is identified. From step 706, the process branches to step 710, where the transmit power level for both devices 300, 302 is incremented. At step 712, schema is exchanged such as in step 704. At step 714, a determination is made as to whether there is a failure in the exchange of the schema. Again, like in step 706, this failure detection may be made by the message error detection module 504. If there is a failure, step 714 branches back to step 710, where the power level for each of the devices 300, 302 is incremented again. This process continues until there is not a failure at step 714, at which time step 714 branches to step 716 and the current power level of the two devices is set as the whisper mode of the two devices.

Figure 8:
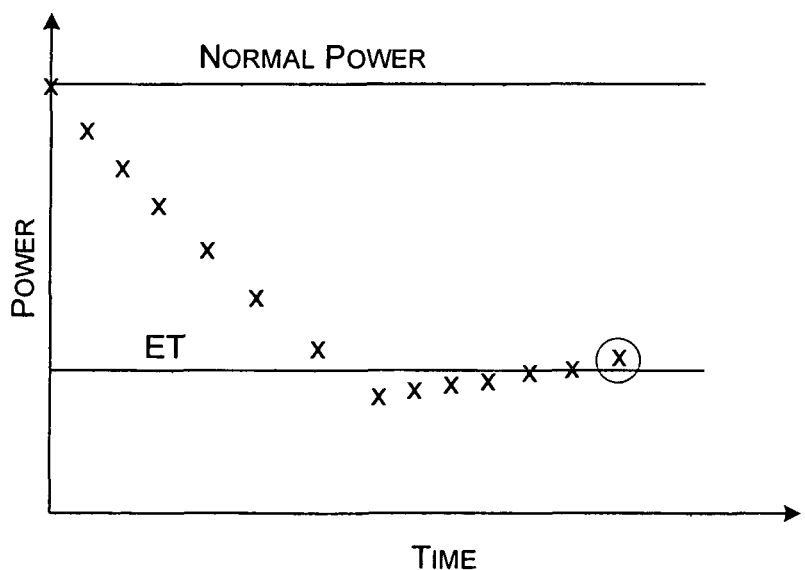
FIG. 8 is a graph representing power level versus time utilizing the method of FIG. 7.

The process of FIG. 7 is depicted graphically in FIG. 8. FIG. 8 is a graph representing power level versus time utilizing the method of FIG. 7. As can be seen in the drawing, as power level is decremented during steps 704 to 708, the power level decreases until it reaches a transmission error level TE. The process then reaches step 710, where the power level is incremented until, through the process of steps 710-714, the power level goes back above the transmission error level TE in the diagram. Utilizing this method, a sufficiently low error-rate transmission level slightly above transmission error level TE may be found, shown as a circled data point in FIG. 8. Settings establishing this successful power level that is slightly above the transmission error level TE may be utilized to establish the whisper mode in the process shown in FIG. 6.

If desired, the amount the transmit power is decremented in step 708 may be greater than the amount the transmit power is incremented in step 710. In this manner, power may be decremented at greater steps until a large transmission error rate occurs, allowing the process to proceed faster, and then incremented in small increments in an effort to find a sufficiently low error-rate power level as close as possible to the transmission error level TE. Incrementing at a smaller increment increases the chance that a smaller lower whisper mode level to be found. The larger decrements and smaller increments are depicted in FIG. 8.

Figure 9:
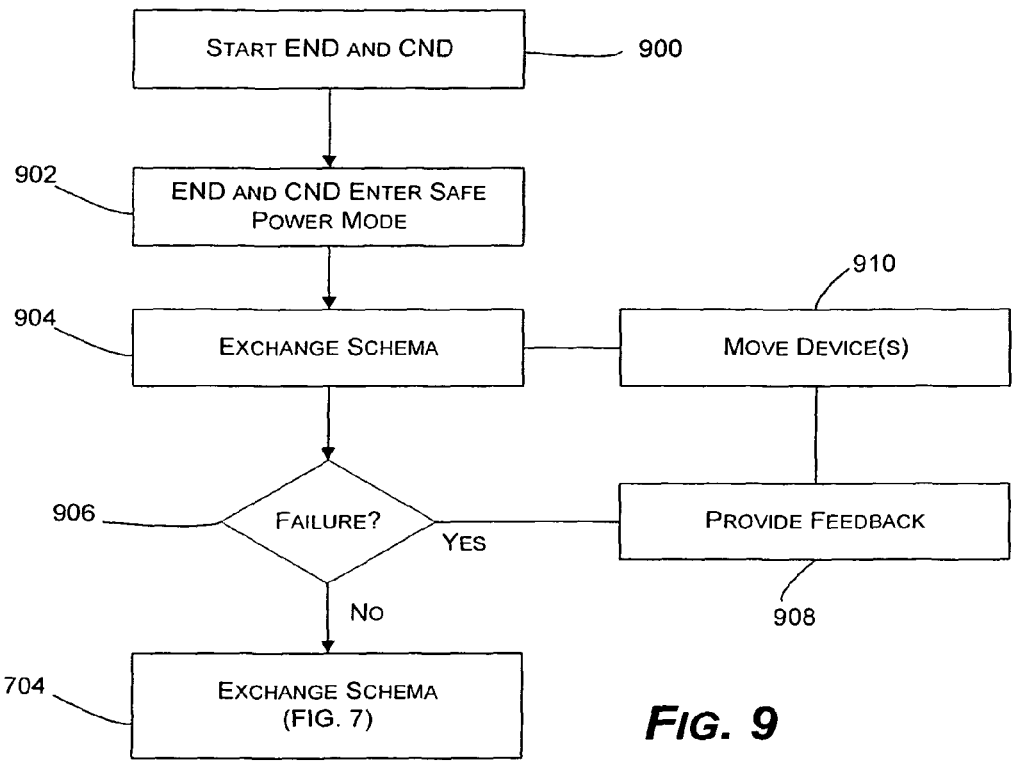
FIG. 9 is a flowchart of a process for discovering whisper mode in accordance with an alternate embodiment of the invention.

Although the process depicted in FIG. 7 may be utilized, in accordance with an alternate embodiment of the invention, transmission does not begin at normal power mode. FIG. 9 is a flowchart generally representing steps for discovering whisper mode settings in accordance with an alternate embodiment of the invention that does not begin at normal power mode. In accordance with the process in FIG. 9, a safe power transmission mode is established, and the established network device 300 and the connecting network device 302 begin at this safe power mode. The safe power transmission mode represents a transmit power level that is generally safe for exchanging the secret information of step 604, and for example represents a power level corresponding to transmission of a safe distance, such as 2-3 meters. The safe power transmission mode may be established empirically, for example sufficient transmission power to transmit a signal two meters, or may be established through experimentation or another method. As can be appreciated, the closer the devices and the lower the transmission power therebetween, the less likely for interception and/or eavesdropping by unwanted third parties. Thus, a lower safe power transmission mode provides more protection against interception and/or eavesdropping.

In any event, beginning at step 900, the user begins the start sequence. At step 902, the network devices 300, 302 go into safe power mode. At step 904, the network devices 300, 302 exchange schema, similar to step 704. At step 906, a determination is made whether there is a failure (i.e., whether there is an error in received schema or the error rate is too high). If a failure occurs at this first attempt to exchange schema, then step 906 branches to step 908, where the user is provided feedback, for example, told to move the devices 300, 302 closer together. At step 910, the user moves the devices closer together, and the process then branches back to step 904. If there is not a failure, then step 906 branches to step 704 of FIG. 7. The process then proceeds as described with FIG. 7.

Figure 10:
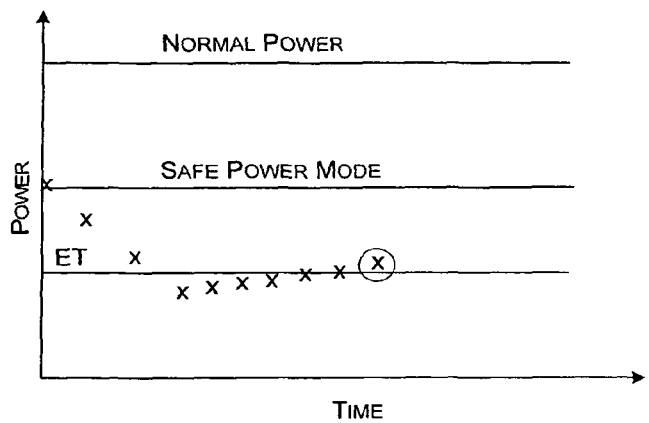
FIG. 10 is a graph representing power level versus time utilizing the method of FIG. 9.

FIG. 10 is a graph generally representing power versus time for the process of FIG. 9. As can be seen, the process is very similar to the process shown in FIG. 8, except that the process begins at a lower power setting, i.e., the safe power mode (SP).

Figure 11:
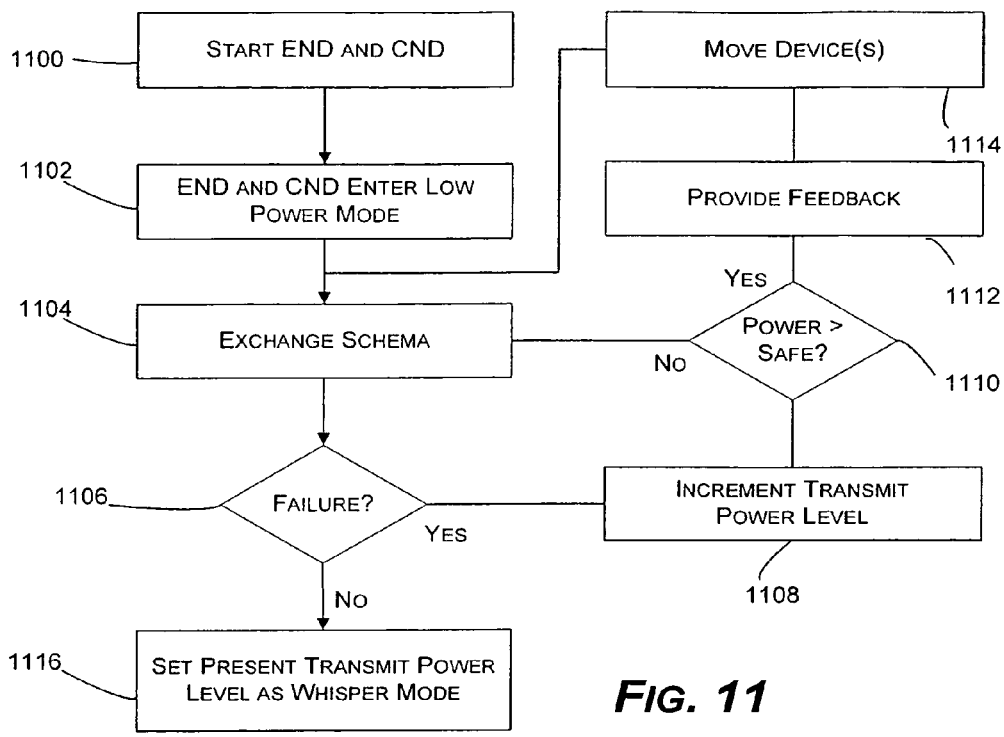
FIG. 11 is a flowchart of a process for discovering whisper mode in accordance with yet another embodiment of the invention.

FIG. 11 is a flowchart depicting yet another method for discovering whisper mode in accordance with an embodiment of the invention. In accordance with the process depicted in FIG. 11, the initial transmission power level is set at a low setting and then incremented upward. This process even further avoids the possibility of too high of a power level during the discovery process, further preventing unwanted third parties from intercepting the secret information or otherwise interfering in the process.

Beginning at step 1100, the user starts the process, such as in steps 700 and 900 of FIGS. 7 and 9. At step 1102, the established network device 300 and the connecting network device 302 are set at a low power setting, for example the lowest power settings for the devices. At step 1104, schema are exchanged. At step 1106, a determination is made whether failure occurred in the schema exchange. If so, the power level is incremented at step 1108. At step 1110, a determination is made whether the power level is above a safe mode. This safe mode may be established similar to the safe mode in FIG. 9, and represents a power level above which discovery is not permitted. This process provides a safety feature preventing the devices from continuing to attempt to exchange schema at a power level deemed risky by the developer.

If the power level has not exceeded the safe mode, then step 1110 branches back to step 1104, where the process continues to increment the power level through step 1104-1108. If the safe mode has been exceeded, then step 1110 branches to step 1112, where feedback is provided to the user, for example to move the devices closer together. At step 1114, the user moves the devices closer together and the process then branches back to step 1104. At the point at which the failure is no longer reached on the exchange of schema, step 1106 branches to step 1116, where the present power levels of the devices 300, 302 are set as the whisper mode.

Figure 12:
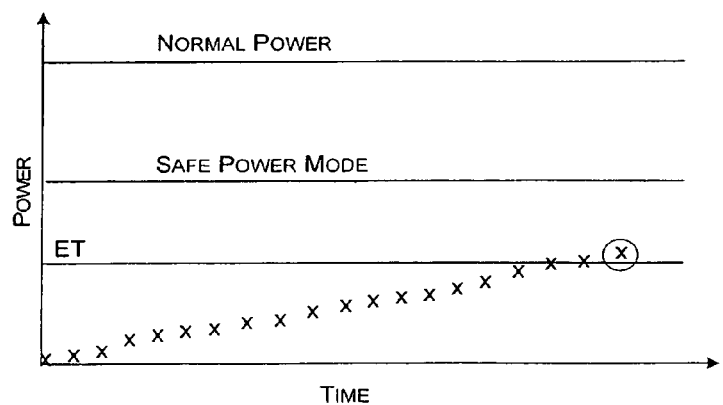
FIG. 12 is a graph representing power level versus time utilizing the method of FIG. 11.

The process of FIG. 11 is depicted graphically in FIG. 12. As can be seen, the power level increments upward until it exceeds an error transmission level (ET), at which point whisper mode is set. If the process had continued up to above a safe power level (SP) without a sufficiently low error rate transmission, then the feedback of steps 1112 and 1114 would be provided.

Figure 13:
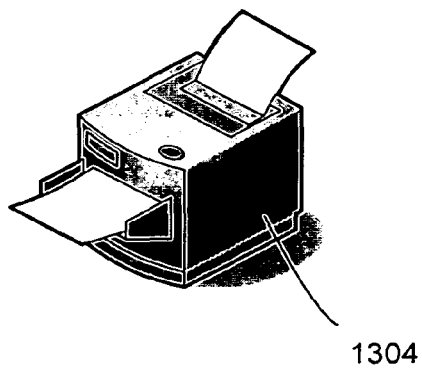
FIG. 13 is a diagram representing a connection being established by an intermediary device to an established network device in accordance with an embodiment of the invention.
Figure 14:
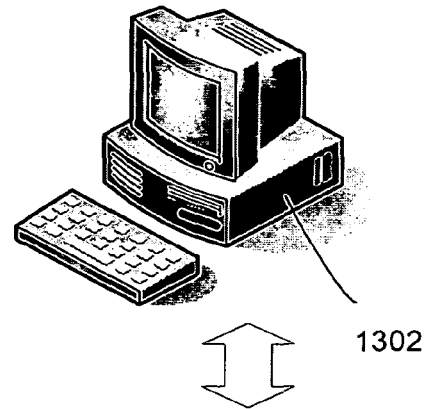
FIG. 14 is a diagram representing connection by the intermediary device to a connecting network device in accordance with an embodiment of the invention.
Figure 14:
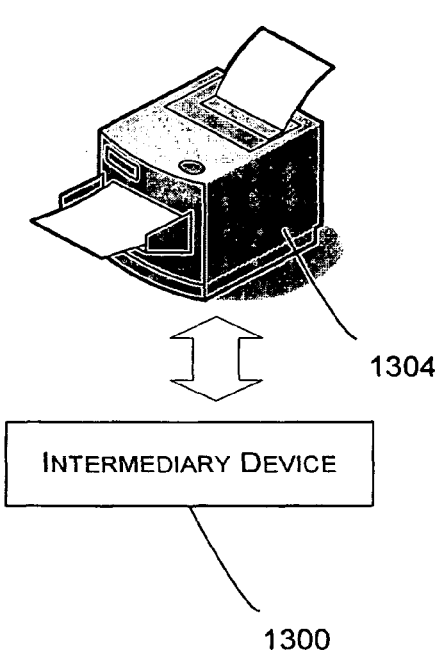
Figure 14:
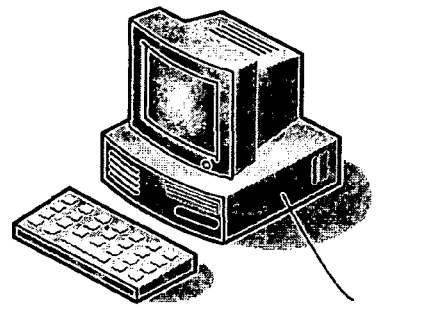

In accordance with some embodiments, as shown in FIG. 13, an intermediary device 1300 may be utilized for performing the methods of the inventions. As an example, a connecting network device, such as a printer 1304, may seek connection to a wireless network to which an established network device, such as a computer 1302 is already connected. However, movement of the two devices 1302, 1304 to close proximity may be difficult. Therefore, in accordance with an embodiment, the intermediary device 1300 may be utilized as a proxy for a connecting device provisioning the connecting network device 1304. The intermediary device 1300 may be a portable electronic device that includes wireless network hardware and software so that it may perform the wireless mode detection and secret information exchange shown in FIG. 6. That is, the intermediary device 1300 may receive the information from the established network device 1302 (FIG. 13) and then transmit that information to the connecting network device 1304 (FIG. 14). Both of these transmissions may be done wirelessly using the method of FIG. 6, or one or the other may be done via a hardwired connection. For example, the intermediary device 1300 may include a USB connection, and may connect to the established network device 1302 via the USB connection, receive the secret information through the USB connection, and then provide the secret message to the connecting network device 1304 utilizing the wireless provisioning in FIG. 6.

Figure 15:
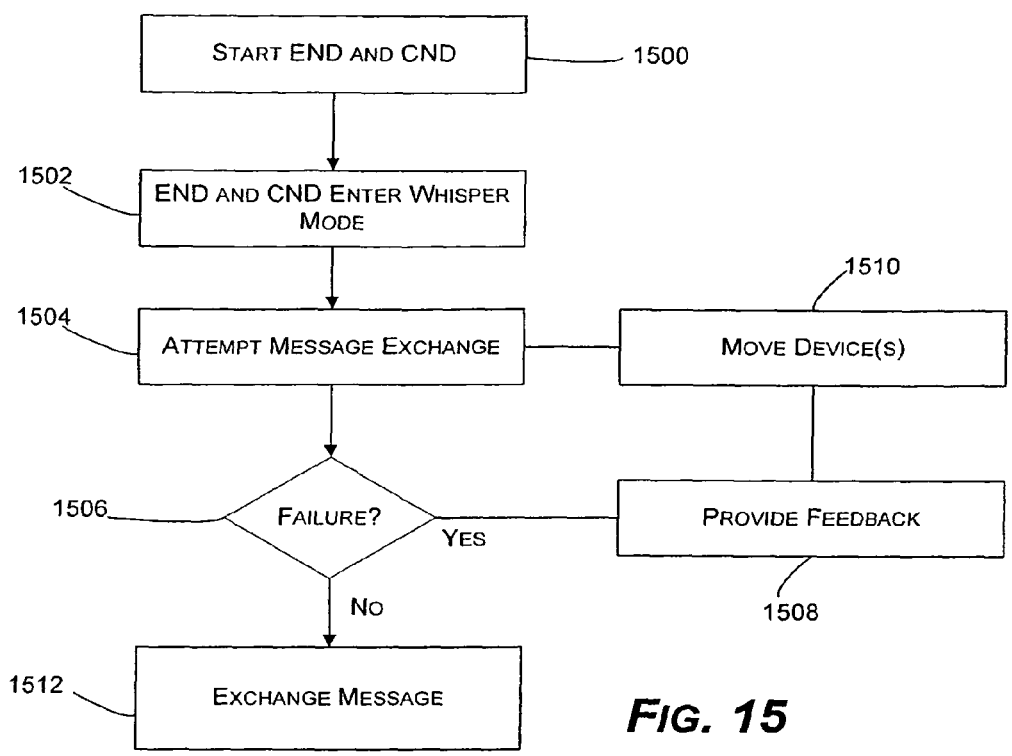
FIG. 15 is a flowchart depicting a method in which whisper mode is preset for devices in accordance with an embodiment of the invention.

FIG. 15 is a flowchart depicting a method in which whisper mode is preset for devices in accordance with an embodiment of the invention. In accordance with the process depicted in FIG. 15, the whisper mode is set prior to use by a user, for example by a manufacturer. The manufacturer may, for example, determine a whisper mode empirically, for example sufficient transmission power to transmit a signal two meters, or whisper mode may be established through experimentation or another method.

Beginning at step 1500, the user starts the process, such as in steps 700 and 900 of FIGS. 7 and 9. At step 1502, the established network device 300 and the connecting network device 302 are set at whisper mode. The devices may, for example, start at a normal power level to discover each other and then switch to preset whisper mode, or one or both of the established network device 300 and the connecting network device 302 may start in whisper mode. The connecting network device 302 may, in another example, always operate in whisper mode.

At step 1504, an exchange of secret information is attempted. At step 1506, a determination is made whether failure occurred in the exchange. If so, then step 1506 branches to step 1508, where feedback is provided to the user, for example to move the devices closer together. At step 1510, the user moves the devices closer together and the process then branches back to step 1504. At the point at which the failure is no longer reached on the exchange, step 1506 branches to step 1512, where the secret information is exchanged.

Security of wireless communications may be further increased by verifying that a connecting network device is in close proximity to an established network device before the established network device provides security information or otherwise authenticates the connecting network device. If a connecting network device is required to be in proximity to an established network device to be authenticated, physical security measures around the established network device can preclude unauthorized third parties from gaining access to the established network device or to a wireless network through the established network device.

Figure 16:
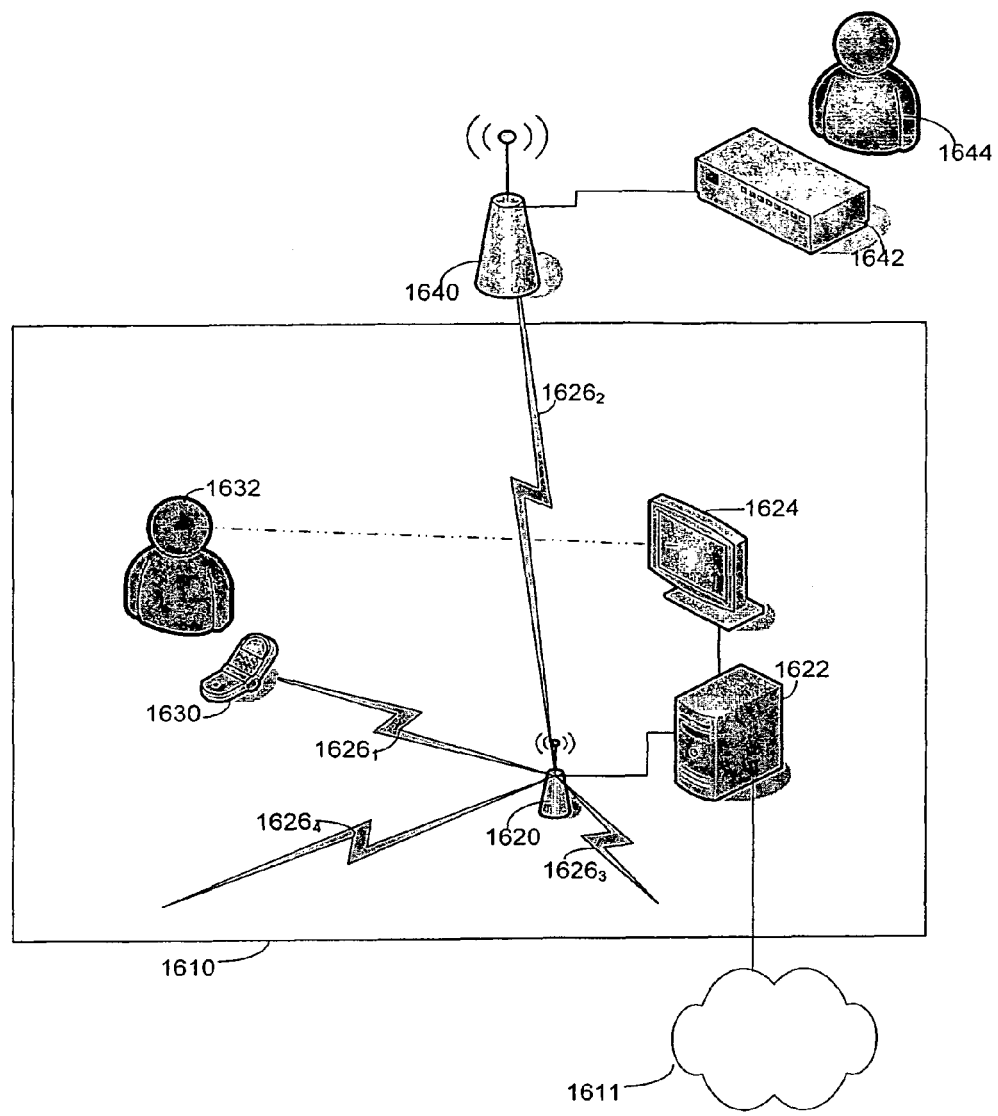
FIG. 16 is a sketch illustrating a process of authenticating a device according to an embodiment of the invention.

The area in proximity to the established network device may be defined in any suitable way. In the embodiment of FIG. 16, room 1610 defines an area around an established network device in which a connecting network device must be located for authentication. Because room 1610 has physical boundaries, such as walls, a floor and a ceiling, physical security measures may be employed to exclude an unauthorized third party from room 1610. Thus, by verifying that a user seeking access to a network is within room 1610, further assurances may be obtained that the user seeking access is an authorized user.

In an embodiment in which the established network device is also within room 1610, a connecting device may be authenticated if the distance between the connecting device and the established network device is less than a distance across room 1610. Therefore, one approach to validating that a connecting network device is used by an authorized user may be to measure the distance between the connecting network device and the established network device.

A conventional network card may support range measurement functionality as part of implementing a wireless MAC protocol. Range measurement functionality, for example, may be supported in network devices that include timers that can record the time at which packets are transmitted and received. In a range measurement mode, a first device may transmit a packet to a second device. In response, the second device may transmit a response to the first device. The first device, by tracking the time between sending the packet and receiving the response, may compute the roundtrip delay between the two devices. This delay includes a delay caused by propagation of the packets between the devices and delay in processing the packets on the second device.

Because the distance between the two devices is not related to the processing delay, this delay may be identified and subtracted from the total delay to determine the propagation delay. To measure the processing delay, the second device may use a timer to track the time between receiving the first packet and transmitting a response. These two times may be used to compute the actual transit time. For a packet passing between the devices, the transit time can be related to a separation distance between the two devices based on a simple calculation using the propagation speed of wireless communications.

While measuring separation in this fashion may be adequate in some embodiments, in some instances, this approach for range measurement is susceptible to a man in the middle attack. If the value reflecting processing delay on the second device is increased, the computed delay between transmission of the first packet and reception of the second packet attributed to propagation delay decreases. Thus, the separation between the two devices appears less than it actually is if an unauthorized third party intercepts range measurement communications between the devices and substitutes its own response messages for those of the authorized device. In this way, the unauthorized third party may gain access to the network by using "range spoofing" to trick the established network device into thinking the unauthorized third party is in room 1610.

FIG. 16 illustrates an alternative approach for verifying proximity of a connecting network device that is less susceptible to range spoofing. FIG. 16 shows a server 1622 coupled to network 1611. Transmitter/receiver 1620 is connected to server 1622. Accordingly, server 1622 may be configured to allow wireless devices communicating through transmitter receiver 1620 to gain access to network 1611. In the embodiment illustrated, server 1622 and transmitter/receiver 1620 act as a wireless access point for network 1611. Accordingly, server 1622 represents an established network device.

In the scenario pictured in FIG. 16, an authorized user 1632 is located within room 1610. Authorized user 1632 has a portable electronic device, here illustrated as Smartphone 1630. Authorized user 1632 is attempting to make a connection to wireless network 1611 through the access point created by server 1622 and transmitter/receiver 1620. Before server 1622 enables Smartphone 1630 to access network 1611, server 1622 and Smartphone 1630 may exchange security information over wireless path $1626_1$.

However, signals from transmitter/receiver 1620 and Smartphone 1630 may radiate in directions other than along path $1626_1$. Similarly, transmitter/receiver 1620 may receive communications from directions other than along path $1626_1$. Accordingly, FIG. 16 shows transmission paths $1626_2$, $1626_3$ and $1626_4$. Though room 1610 may contain physical boundaries, some or all of the transmission paths may extend outside of room 1610. As a result, an unauthorized user 1644 outside of room 1610 may intercept wireless transmissions from transmitter/receiver 1620 or from authorized devices within room 1610.

FIG. 16 shows that unauthorized user 1644 may have a high power/high gain transmitter/receiver 1640 coupled to an unauthorized device 1642. With this equipment, unauthorized user 1644 may be able to intercept even low power transmissions within room 1610. Therefore, unauthorized user 1644 may engage in a man-in-the-middle attack by monitoring wireless transmissions within room 1610 and emulating an authorized user within room 1610 or otherwise attempting to gain access to network 1611 through server 1622.

To avoid providing access to an unauthorized user outside of room 1610, server 1622 may be programmed to verify that a connecting network device, such as Smartphone 1630, is being operated from within room 1610. In the embodiment illustrated, server 1622 is coupled to display 1624. Server 1622 may be programmed to display, such as through a graphical user interface on display 1624, information defining at least one action to be performed by authorized user 1632 as a way to communicate to server 1622 that a connecting network device is being controlled by that user from within room 1610.

Because of the physical boundaries of room 1610, unauthorized user 1644 outside of room 1610 cannot obtain the information on display 1624. Though unauthorized user 1644 could control transmitter/receiver 1640 to generate on path 1626$_2$ a transmission emulating transmission made by Smartphone 1630 on path 1626$_1$, unauthorized user 1644 will not know the timing of such a transmission specified by information on display 1624 until after the transmission has occurred. Therefore, unauthorized user 1644 is precluded from interfering with that transmission or emulating that transaction at a time required by the instructions on display 1724. Accordingly, if server 1622 detects that actions were taken in response to information presented on display 1624, server 1622 may verify that the connecting network device is in fact in close proximity and is therefore being operated by an authorized user.

In the example illustrated, information provided through display 1624 may have a random component to preclude unauthorized users 1644 from guessing an action required for authentication and therefore devising a way to spoof the authentication process. For example, the timing of the information displayed may be random. Alternatively, the specific actions may be selected randomly from a list of possible actions. Possible actions may include moving the connecting network device in a pattern relative to transmitter/receiver 1620. Server 1622 may use a conventional range measurement process to detect the pattern of motion of the connecting network device. As another example, an action may include generating with the connecting network device messages of a proscribed format, such as may occur from entering a pattern of keystrokes on Smartphone 1630. However, any action or combination of actions that can be detected by server 1622 may be proscribed, and any suitable mechanism to detect that action may be used.

Figure 17:
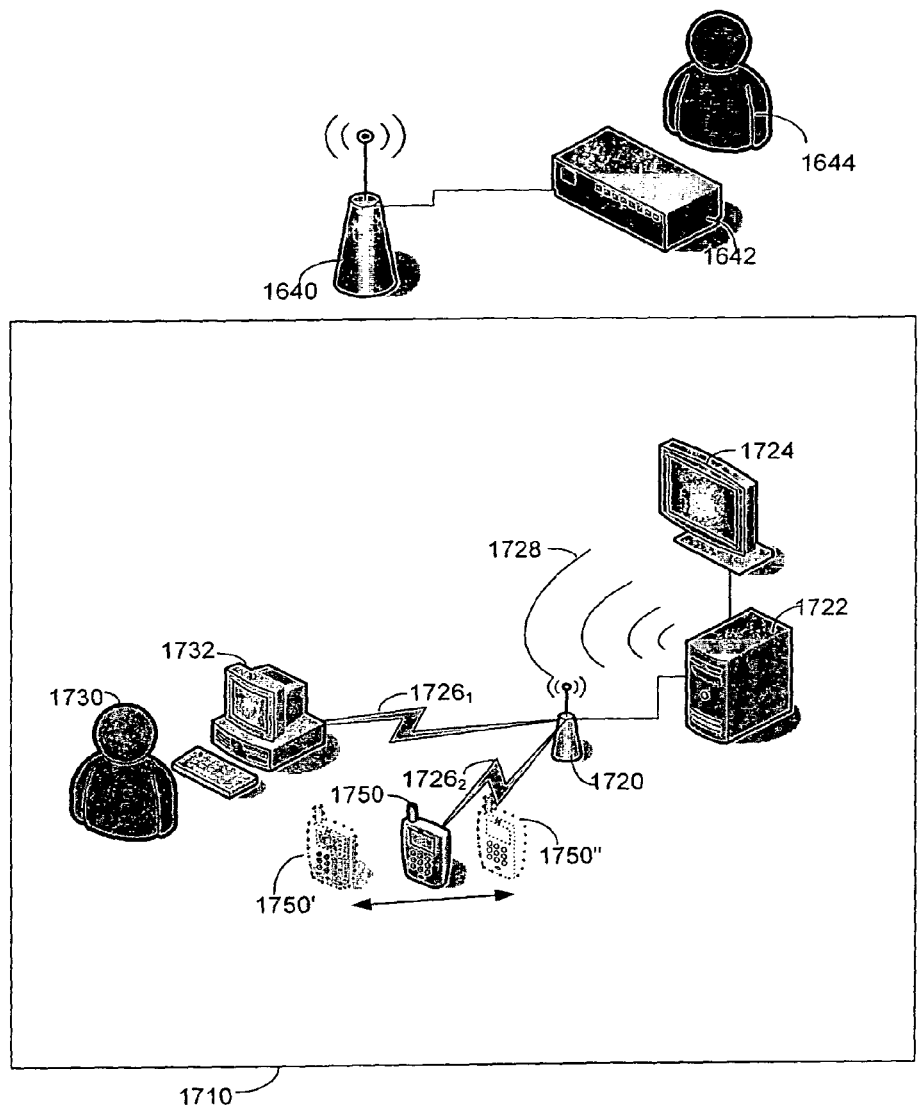
FIG. 17 is a sketch of an alternative embodiment of an authentication process according to an embodiment of the invention.

Information defining an action to be taken by an authorized user 1632 within room 1610 may be provided in forms other than visually through a display screen. Any mechanism for providing information that is obtainable only proximate the server 1622 or transmitter/receiver 1620 may be used. FIG. 17 provides an example of an alternative embodiment in which information is communicated using sound. FIG. 17 shows server 1722 acting as an existing network device within room 1710. In this example, authorized user 1730 is operating a desktop computer 1732 seeking to establish a wireless connection to server 1722. Computer 1732 can communicate wirelessly over transmission path 1726$_1$.

Sound 1728 is emitted by server 1722. Sound 1728 may be emitted in any suitable fashion, such as using a conventional sound card with voice generation software inside server 1722. Sound 1728 may convey to authorized user 1730 specific actions to be taken to validate that authorized user 1730 is within room 1710. However, unauthorized user 1644, located external to room 1710 is unable to detect sound 1728.

In the embodiment illustrated, desktop computer 1732, though seeking to connect wirelessly, is too large to be readily moved by an average user. The action directed by sound 1728 does not involve moving desktop computer 1732 as the connecting network device. In some embodiments, sound 1728 may direct authorized user 1730 to take action that does not involve motion of desktop computer 1732. In other embodiments, a proxy device may be used to perform the action dictated by sound 1728. The proxy device may communicate wirelessly over a transmission path 1726$_2$, which is different than transmission path 1726$_1$ used by computer 1732.

In the embodiment illustrated, Smartphone 1750 may be moved as a proxy for desktop computer 1732. Sound 1728 may contain human perceptible instructions to move Smartphone 1750 relative to transmitter/receiver 1720. Accordingly, to authenticate desktop computer 1732, user 1730 may move Smartphone 1750 between positions 1750' and 1750" in a pattern directed by sound 1728. Server 1722 may use conventional range measuring software or any other suitable mechanism to determine that Smartphone 1750 has been moved between positions 1750' and position 1750" at times dictated by the commands contained in sound 1728.

FIG. 17 shows a wireless device being moved between two positions, 1750' and 1750" according to a pattern communicated by information that is audible to authorized user 1730. FIG. 16 shows, as one alternative, visual communication of information. However, any mechanism to communicate information in a form obtainable only in proximity to the existing network device may be suitable for use in the invention. Moreover, the invention is not limited to moving a wireless device between two positions. An action described to an authorized user may involve motion of the device between any number of positions.

In the embodiments illustrated, information is communicated audibly or visibly to an authorized user within a defined proximity of an established network device. This information is intended to be obtainable only by authorized users proximate to be established network device. While one could envision scenarios in which an unauthorized user 1644 could take extensive measures to gain access to the information within room 1610, such as through the use of sophisticated eavesdropping equipment, the information is deemed obtainable only proximate the first device, because, without using such extraordinary measures, it is not available.

Having thus described several aspects of at least one embodiment of this invention, it is to be appreciated that various alterations, modifications, and improvements will readily occur to those skilled in the art. For example, embodiments are described in which a connecting network device is moved into close proximity with an established network device. However, it is not a requirement of the invention that the connecting network device be movable. The established network device or a proxy for the established network device may be movable. Alternatively, both the established network device and connecting network device may be positioned in close proximity that avoids the need for repositioning either device to allow communication in a low power mode.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer storage medium (or multiple computer readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a first device to authenticate a portable wireless device, the method comprising:
    with the first device, selecting a pattern of physical movements from among a set of patterns or randomly generating the pattern of physical movements and prescribing the selected pattern to the portable wireless device by communicating wirelessly, via an antenna of the first device, with the portable wireless device to provide to the portable wireless device pattern information indicating the pattern of physical movements;
    analyzing signal information obtained from the antenna to determine, by the first device, whether the portable wireless device has been physically moved with movements that match the pattern of physical movements prescribed by the selected pattern; and
    wherein when it has been determined that the portable wireless device has been physically moved according to the pattern of physical movements then the portable wireless device is determined to have been authenticated, and wherein when it has been determined that the portable wireless device has not been moved according to the pattern of physical movements then the wireless device is determined to have not been authenticated, and wherein pattern information provided to the first device comprises information configured to be used by the first device to display or play a description of the pattern of physical movements.

2. The method of claim 1, wherein, according to the pattern information, the portable wireless device provides audio instructions describing the pattern of physical movement.

3. The method of claim 1, wherein according to the pattern information, the portable wireless device displays information describing the pattern of physical movements.

4. The method of claim 1, further comprising providing an authentication of the portable wireless device in response to determining that the portable wireless device has been physically moved according to the pattern of physical movements.

5. The method of claim 1, wherein the determining whether the portable wireless device has been physically moved according to the pattern of movements comprises measuring at a plurality of times separation between the portable wireless device and a reference point, the measuring comprising receiving a wireless communication from the second device via the antenna.

6. The method of claim 5, wherein the determining whether the portable wireless device has been physically moved according to the pattern of movements further comprises:
  measuring, based on at least one wireless MAC (media access control) protocol, separation between the portable wireless device and the reference point.

7. A method, performed by a first device comprising a first antenna, the method authenticating a second device comprising a second antenna, the method comprising:
  providing, from the first device to the second device, text or media indicating a pattern of physical movements, the physical movements including at least one movement away from first device;
  receiving wireless communications from the antenna of the second device;
  analyzing the received wireless communications to determine whether the wireless communications indicate that the second device has moved relative to the first device according to the pattern of physical movements; and
  indicating that the second device is authenticated when the received wireless communications have been determined to indicate that the pattern of physical movements occurred.

8. The method of claim 7, wherein the computer-executable instructions for performing the method further comprise computer-executable instructions for performing steps comprising:
  communicating with the second device in a low power wireless mode.

9. The method of claim 8, wherein the computer-executable instructions for performing the method further comprise computer-executable instructions for performing steps comprising:
  in response to the indicating, communicating secret information to the second device in the low power wireless mode.

10. The method of claim 9, wherein the method further comprises providing, by the second device, information in the human perceptible format that indicates the pattern of physical movements.

11. The method of claim 7, wherein the wireless communications comprise a plurality of range measurement packets in accordance with a MAC protocol of a wireless network.

12. The method of claim 7, wherein:
  the analyzing comprises causing a network interface card to measure a propagation time for wireless communication with the device at least two times, at least one of those times corresponding to the movement away from the first device; and
  the determining is based on data obtained when propagation time is measured at least two times.

13. A method of authentication comprising:
  receiving, at a portable device from an authenticating device, via a wireless receiver of the portable device, information indicating a pattern of motions prescribed by the authenticating device;
  outputting, by a portable device, information indicating the pattern of motions, the pattern of motions comprising a motion toward the authenticating device and a motion away from the authenticating device; and
  transmitting, by a wireless transmitter of the portable device, signals while the portable device is being physically moved by a user of the portable device according to the pattern of motions such that the portable device moves away from the authenticating device and toward the authenticating device.

14. The method of claim 13, wherein the portable device is a portable phone.

15. The method of claim 13, wherein the authenticating device comprises a wireless access point, the method further comprising:
  initiating wireless communication between the portable device and the wireless access point to gain access by the portable device to a wireless network.

16. The method of claim 15, wherein the pattern of motions includes touching the wireless access point with the portable device.

17. The method of claim 15, further comprising:
  receiving with the portable device security information from the wireless access point.

18. The method of claim 13, further comprising:
  initiating wireless communication between the portable device and an access point to gain access by the device to a wireless network; and
  wherein the access point are the authenticating device.

19. A method of authenticating a wireless device for wireless access to a wireless access device, the method performed by the wireless access device, the method comprising:
  receiving a request from the wireless device for network access via the wireless access device;
  responsive to the request, randomly selecting or generating a physical movement pattern comprised of indicia of a prescribed sequence of physical movements;
  informing the wireless device of the movement pattern, and, according to the informing, the wireless device providing output perceivable by a user thereof to inform the user of the movement pattern;
  after the informing, monitoring emissions from the wireless device, identifying ranges between the first and second wireless devices from the emissions using a range measurement process, and according to the identifying determining whether the wireless device has moved the prescribed sequence of physical movements; and
  determining whether to grant the request for wireless access according to the determining of whether the wireless device has moved the prescribed sequence of physical movements.

* * * * *